United States Patent
Owhadi et al.

(10) Patent No.: US 11,817,089 B2
(45) Date of Patent: Nov. 14, 2023

(54) GENERATING ASPECTS FROM ATTRIBUTES IDENTIFIED IN DIGITAL VIDEO AUDIO TRACKS

(71) Applicant: Pyxis.AI, San Jose, CA (US)

(72) Inventors: Eric Owhadi, Tomball, TX (US); Bharat Naga Sumanth Banda, Karnataka (IN); Narendra Goyal, Campbell, CA (US); Hong Ding, Granite Bay, CA (US)

(73) Assignee: Pyxis.AI, San Jose, CA (US)

( * ) Notice: Subject to any disclaimer, the term of this patent is extended or adjusted under 35 U.S.C. 154(b) by 142 days.

(21) Appl. No.: 17/222,136

(22) Filed: Apr. 5, 2021

(65) Prior Publication Data

US 2022/0319504 A1  Oct. 6, 2022

(51) Int. Cl.
| | |
|---|---|
| *G10L 25/57* | (2013.01) |
| *G10L 15/18* | (2013.01) |
| *G06F 40/279* | (2020.01) |
| *G06F 40/117* | (2020.01) |
| *G10L 15/30* | (2013.01) |
| *G10L 15/22* | (2006.01) |

(52) U.S. Cl.
CPC ........ *G10L 15/1815* (2013.01); *G06F 40/117* (2020.01); *G06F 40/279* (2020.01); *G10L 15/22* (2013.01); *G10L 15/30* (2013.01); *G10L 25/57* (2013.01); *G10L 2015/223* (2013.01)

(58) Field of Classification Search
CPC ..... G10L 15/1815; G10L 15/22; G10L 15/30; G10L 25/57; G10L 2015/223; G10L 15/26; G06F 40/117; G06F 40/279; G06F 40/30; G06F 40/216
See application file for complete search history.

(56) References Cited

U.S. PATENT DOCUMENTS

| | | | |
|---|---|---|---|
| 10,628,264 B1 | 4/2020 | Janakiraman et al. | |
| 2011/0238409 A1* | 9/2011 | Larcheveque | ...... G10L 15/1815 704/239 |
| 2018/0121443 A1* | 5/2018 | Bao | .......... G06F 16/36 |
| 2020/0251102 A1* | 8/2020 | Benkreira | ............ G06K 9/6263 |
| 2020/0372066 A1* | 11/2020 | Saggi | ...................... G06F 16/45 |
| 2020/0380980 A1* | 12/2020 | Shum | ...................... G10L 15/18 |

FOREIGN PATENT DOCUMENTS

| | | |
|---|---|---|
| WO | 2021030915 A1 | 2/2021 |
| WO | WO-2021030915 A1 * | 2/2021 ........... G06F 40/279 |

OTHER PUBLICATIONS

International Search Report of the International Searching Authority dated Aug. 2, 2022 in International Patent Application No. PCT/US2022/023500.

Written Opinion of the International Searching Authority dated Aug. 2, 2022 in International Patent Application No. PCT/US2022/023500.

* cited by examiner

*Primary Examiner* — Abul K Azad

(74) *Attorney, Agent, or Firm* — Leydig, Voit & Mayer, Ltd.

(57) ABSTRACT

A collection of digital video files may contain a large amount of unstructured information in the form of spoken words encoded within audio tracks. The audio tracks are transcribed into digital text. Attributes are extracted from the digital text and mapped to a particular subject matter aspect. Attribute to aspect mappings provide a useful organization for the unstructured information. Furthermore, sentiment scores and trends for one or more aspects may be determined and displayed.

18 Claims, 11 Drawing Sheets

US 11,817,089 B2

GENERATING ASPECTS FROM ATTRIBUTES IDENTIFIED IN DIGITAL VIDEO AUDIO TRACKS

FIELD OF ART

The present disclosure relates generally to machine learning, and more particularly to generating aspects from attributes identified in digital video audio tracks.

BACKGROUND

Digital video clips are being created and shared at an increasing rate, and are currently the dominant form of user-created digital content online. Such digital content typically includes individuals expressing their opinions on a variety of subjects. Shared digital video clips cover nearly all imaginable topics and represent a potentially significant source of insight into market trends and user sentiment. These digital video clips may also potentially hint at latent market trends and needs well before such trends or needs are recognized by conventional market observation techniques. In a practical scenario, hundreds to potentially millions of video clips would need to be analyzed to extract useful trend or sentiment information about a specific topic or product. Prior art techniques are unable to process the necessary volume of video clips in a useful duration of time or to identify sufficient correlations across the video clips and reveal useful information. Thus, there is a need for addressing these and/or other issues associated with the prior art.

SUMMARY

A method is disclosed for generating, by a cloud server system, aspects from a set of digital video files. The method comprises decoding digital audio signals from a set of digital video files, transcribing the digital audio signals into corresponding digital text data, extracting attributes from the digital text data, determining a mapping between the attributes and an aspect, and generating, by the cloud server system, a set of mapping data that includes the mapping and embedding data corresponding to the attributes and the aspect. In an embodiment, the digital text data comprises different words, and each of the different words is assigned an embedding vector. In an embodiment, the aspect is a descriptor associated with a collection of attributes related to a specific subject.

Another method is disclosed for causing the cloud server system to generate aspects from a set of digital video files. The method comprises directing a cloud server system to decode digital audio signals from a set of digital video files, directing the cloud server system to transcribe the digital audio signals into corresponding digital text data, directing the cloud server system to extract attributes from the digital text data, directing the cloud server system to determine a mapping between the attributes and an aspect, and directing the cloud server system to generate a set of mapping data and embedding data corresponding to the attributes and the aspect. In an embodiment, the digital text data comprises different words, and each of the different words is assigned an embedding vector.

Another method is disclosed for generating a visual display based on vector distance. The method comprises receiving mapping data that associates a set of mapped attributes with an aspect, receiving word embedding vectors corresponding to the set of mapped attributes and word embedding vectors corresponding to a set of unmapped attributes, receiving a user interface request, and generating a visual display responsive to the user interface request. In an embodiment, generating the visual display comprises calculating a vector space distance between the aspect and each unmapped attribute, sorting the unmapped attributes according to each vector space distance, and rendering a display image depicting the unmapped attributes is sorted order.

DETAILED DESCRIPTION

Figure 1A:
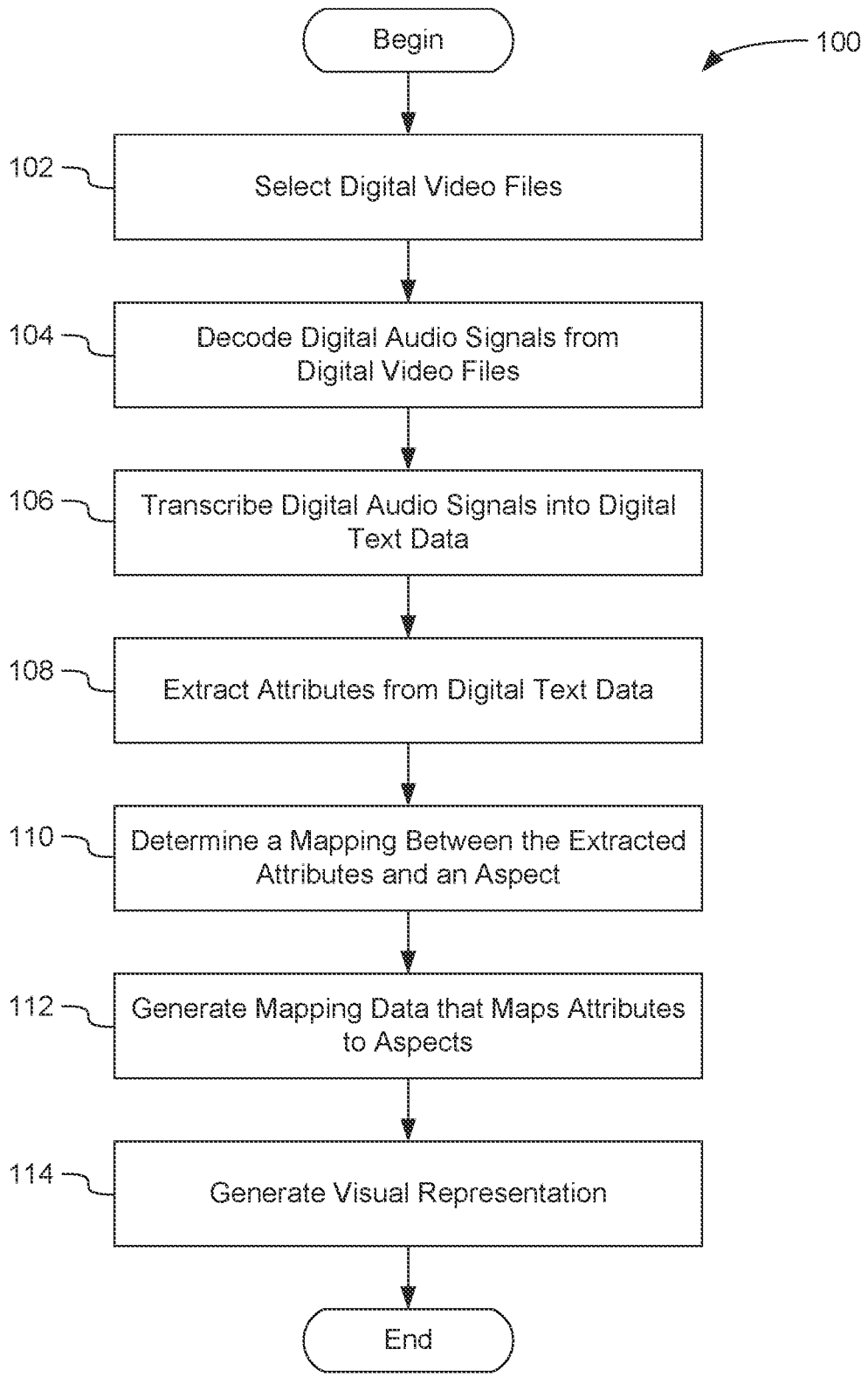
FIG. 1A illustrates a flow chart of a method for generating aspects from a corpus of digital video files, in accordance with an embodiment.

A collection of digital video files may contain a large amount of unstructured information in the form of spoken words encoded within associated audio tracks. Useful information regarding a specific subject may be extracted from the spoken words. These words can be identified as attributes and/or aspects related to the subject. Exemplary subjects include, but are not limited to, topics (e.g., shaving) and products (e.g. razors). An attribute may be a descriptive term (e.g., excellent and blue) or named entity (e.g., phone and display), and multiple attributes may have similar meaning (e.g., blue and azul; color and hue; or display and screen). An aspect may comprise a word or phrase that provides a meaningful descriptor for a collection of attributes that relate to the subject. An aspect may frequently be a noun or noun phrase; however, an aspect can also be a verb, verb phrase, adjective, adverb, or any other part of speech. An aspect may comprise a word that is also an attribute.

A given aspect may be specified by a user or discovered automatically through natural language processing, pattern recognition and analysis driven by artificial intelligence (AI), or combinations thereof. A useful trend or insight may be indicated as a high total occurrence or an increasing frequency over time for a given aspect or a high total occurrence or an increasing frequency over time of certain attributes for a given aspect. Furthermore, a quantitative sentiment score for a given aspect may be determined for the digital videos and, optionally, within different time intervals or over different studies, each comprising different sets of digital videos and each potentially revealing a useful sentiment trend for a given aspect. Any sentiment analysis technique may be performed to estimate a quantitative sentiment score for an aspect and/or attribute. In general, a technically proper combination of attributes and aspects with quantitative sentiment scores can indicate an insightful opinion from an individual or collection of individuals about the subject.

Embodiments of the present disclosure identify attributes and aspects within the collection of digital video files and map the attributes to the aspects. In an embodiment, words are transcribed from the audio tracks to generate digital text data. That digital text data is then analyzed and certain words or word phrases are identified as attributes, and one or more of the attributes may then be mapped to a corresponding aspect. In some embodiments, a plurality of groups of attributes from the digital text data can be mapped to multiple aspects.

A vector space distance may be calculated between a word embedding vector for an aspect and word embedding vectors for each of the attributes. Alternatively, the vector space distance may be calculated as the minimum vector space distance between the attribute and attributes mapped to (i.e., belonging to) the aspect. Attributes within a word embedding vector space having relatively small vector space distances to a given aspect may form a cluster associated with the aspect. Attributes within a cluster may be presented through a user interface as candidates to be mapped to the aspect. Additionally, attributes within the cluster may be automatically mapped to the aspect. Furthermore, an aspect may be automatically identified as the attribute or word that is central to a cluster. A visual representation of attribute to aspect mappings may be presented through a user interface.

In an embodiment, a word embedding vector comprises a vector of floating-point values generated to encode the meaning of an associated word. Word embedding vectors may be generated using any technically feasible technique, including well-known techniques in the art. A vector space for word embedding vectors may include many dimensions, with hundreds to thousands of dimensions commonly implemented. In an embodiment, the vector space includes seven-hundred-sixty-eight dimensions. A given word embedding vector provides a distributed representation of a corresponding word, with various meaning components represented as different weights across the different dimensions. In general, words having similar meaning are closer together in the vector space than words having very different meaning. Furthermore, certain salient features or meanings of different words may be aligned along various directions within the vector space.

FIG. 1A illustrates a flow chart of a method 100 for generating aspects from a corpus of digital video files, in accordance with an embodiment. Although method 100 is described in conjunction with the systems and figures disclosed herein, persons of ordinary skill in the art will understand that any system that performs method 100 is within the scope and spirit of various embodiments of the present disclosure. In an embodiment, method 100 is performed by a distributed processing system (e.g., distributed processing system 260 of FIG. 2B). In some embodiments, certain steps of method 100 are performed by a cloud server system (e.g., cloud server system 262) and other steps are performed by a client computer system (e.g., client computer system 270).

In some embodiments, the method 100 is implemented by one or more processors such as a central processing unit (CPU), a parallel processing unit (PPU), a vector processing unit (VPU), a tensor processing unit (TPU), or any combination of the aforementioned processors. Each processor can be configured to execute instructions that cause the processor to perform functions that implement the steps of method 100. In some embodiments, the instructions (i.e., software, computer program products, etc.) are stored on a non-volatile memory connected to the processor and can be loaded from the memory into the processor for execution. Each of the cloud server system and/or the client computer system can include one or more processors and corresponding memory. It will be appreciated that while the method 100 is described in terms of functions implemented by a processor executing a set of instructions, that some or all of the steps of the method 100 can be implemented in special function units or dedicated hardware configured to implement a particular function. For example, certain functions may be implement by a field programmable gate array (FPGA) or other logic circuit that is configured to implement the functions. In an embodiment, the cloud server system includes the one or more processors.

In certain embodiments, the cloud server system is directed, by the client computer system, to perform specific steps of method 100. In certain embodiments, directing the cloud server system may include transmitting instructions to the cloud server system that, when executed by the one or more processors, cause the one or more processors to perform functions or procedures specified by the instructions. In an embodiment, an on-demand function is a function comprising instructions transmitted to (uploaded to) the cloud server system and executed by the one or more processors without a previously provisioned or dedicated server resource instance. In certain embodiments, the instructions are uploaded as a compressed archive/package (e.g., a "ZIP file"), a container image, or any other technically feasible application package construct. In certain embodiments, the cloud server system may perform various on-demand functions in response to the instructions provided by a client computer system and/or other computer system; such on-demand functions may include one or more method steps of method 100.

Method 100 begins at step 102, where the cloud server system selects digital video files. The digital video files may be selected automatically (e.g., according to a set of selection criteria rules), from a specified location or predefined list of digital video files, according to input from a user interface (e.g., executing on a client computer system), or any combination thereof. In other embodiments, the cloud server system selects digital video files as specified manually by a user of the client computer system, where the list of digital video files selected by the user is transmitted to the cloud server system for processing.

At step 104, the cloud server system decodes digital audio signals from the selected digital video files. In an embodiment, an audio decoder system executing on the cloud server system parses, extracts, and decompresses audio data included within the digital video files to generate the digital audio signals. The digital audio signals may be represented in a compressed format, an uncompressed format, or a combination of formats. In various common usage cases, the digital audio signals represent audio waveforms for spoken words within the digital video files.

At step 106, the cloud server system transcribes the digital audio signals into digital text data. For example, a digital audio signal waveform corresponding to the spoken word "hello" may be transcribed into to a character sequence {'h', 'e', 'l', 'l', 'o'}. This and other character sequences may be added to the digital text data. In another example, the spoken word "hello" is transcribed into an index corresponding to the word "hello", and the index is added to the digital text data. More generally, any technically feasible technique may be performed to transcribe the digital audio signals into digital text data (i.e., speech to text) without departing from the scope and spirit of various embodiments.

At step 108, the cloud server system extracts attributes from the digital text data. In an embodiment, the cloud server system executes a natural language sequence tagging system to classify which words and/or word phrases are attributes within the digital text data. The sequence tagging system may classify each word by considering word context from surrounding words. Certain words are classified as attributes (e.g., as defined herein), while other words are classified as non-attributes. In an embodiment the sequence tagging system comprises a "bidirectional encoder representations from transformers" (BERT) language model (LM) system. Such language models are known in the art and various embodiments contemplate known implementations as well as variations on these language models. Furthermore, any technically feasible technique for identifying or tagging attributes may be implemented without departing from the scope and spirit of various embodiments. In an embodiment, the natural language sequence tagging system comprises program instructions that cause the one or more processors to perform a natural language sequence tagging algorithm. In certain embodiments, the natural language sequence tagging algorithm comprises the well-known BERT LM algorithm.

At step 110, the cloud server system and/or the client computer system determines a mapping between the extracted attributes and an aspect. In an embodiment, the client computer system generates a user interface display of different attributes and accepts user input to select and map an attribute to an aspect, such as by dragging and dropping an attribute or collection of attributes within the user interface display. In another embodiment, the cloud server system identifies clusters of attributes according to word embedding vectors for the attributes and maps the attributes within a cluster to an aspect representing the cluster. Furthermore, attribute to aspect mappings may be edited or modified according to user interface input generated at the client computer system.

At step 112, the cloud server system and/or the client computer system generates mapping data that maps attributes to aspects. In this context, a mapping of one or more attributes to an aspect includes any technically feasible data structure or structures that associate the one or more attributes to the aspect. A collection of such mappings is referred to herein as mapping data. Furthermore, the cloud server and/or client computer system may generate embedding data (e.g., word embedding vectors) for any referenced attributes and any referenced aspects. The embedding data may include word embedding vectors associated with the referenced attributes and the referenced aspects. In an embodiment, generating the embedding data may include looking up previously computed word embedding vectors, refining previously computed word embedding vectors, or computing new word embedding vectors. In an alternative embodiment, generating the embedding data may include computing contextualized word embeddings for one or more words comprising an attribute or aspect, as provided by various implementations of the well-known BERT framework.

At step 114, the cloud server system and/or the client computer system generates a visual representation of a mapping between attributes and aspects. In an embodiment, the visual representation comprises user interface elements displaying a list of aspects, a list of attributes for each aspect, and an overall list of attributes. In another embodiment, the visual representation depicts sentiment information (e.g., scores, trends, etc.) corresponding to different aspects; the sentiment information may be generated from one or more of the digital video files. In an embodiment, the sentiment information is generated by performing a regression operation over multiple individual sentiment classifications. The individual sentiment classifications may be generated by a classifier comprising the BERT LM system, in accordance with any technically feasible classification technique or techniques. The individual sentiment classifications may be performed on different attributes and/or sentences comprising digital text data transcribed from the digital video files. In an embodiment, the classifier is a polarity classifier configured to classify an attribute and/or sentence as having a positive, neutral, or negative sentiment. The regression operation then takes the individual sentiment classifications as input to compute a sentiment strength and/or a sentiment score. Any technically feasible regression technique may be performed without departing from the scope and spirit of various embodiments. In an alternative embodiment, the sentiment information is generated by a regression algorithm trained to provide sentiment scores for specific attributes in the digital text data, the attributes having been previously classified as attributes.

Figure 1B:
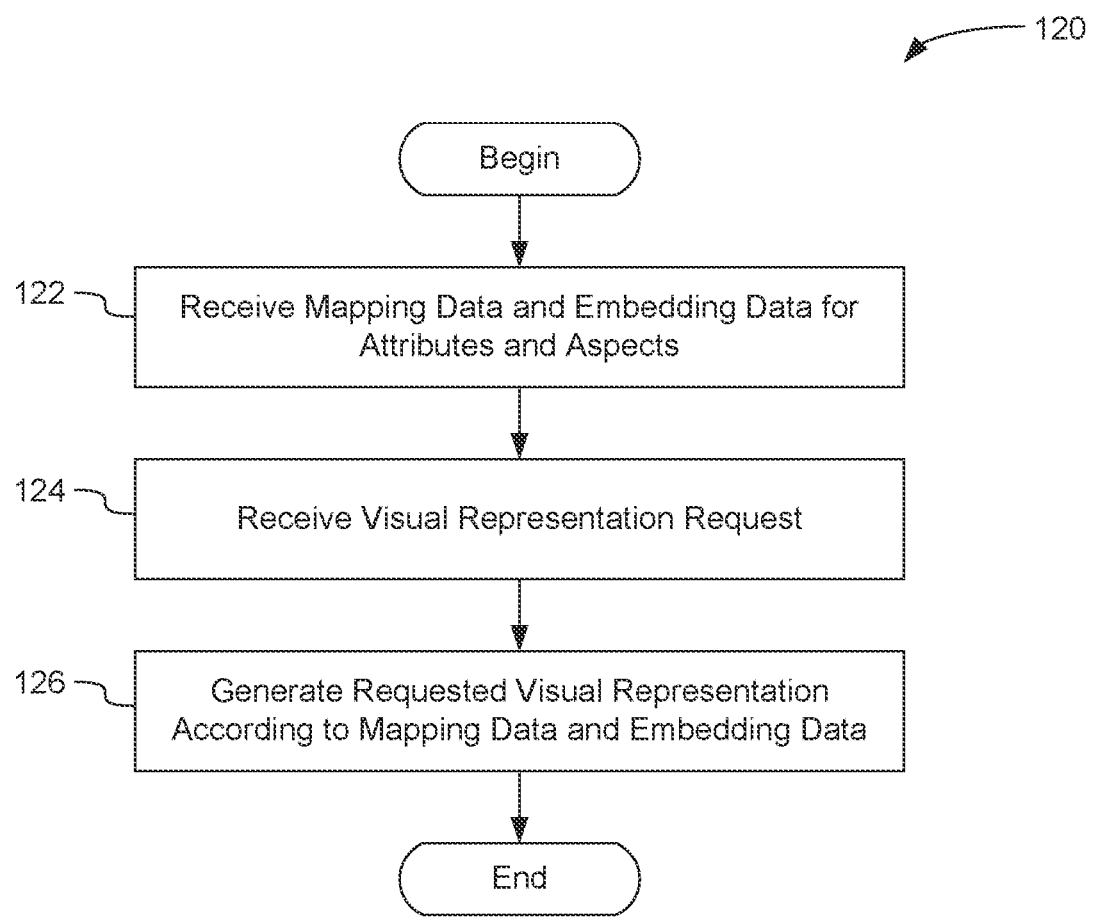
FIG. 1B illustrates a flow chart of a method for a client application to generate a visual representation based on mapping data and embedding data, in accordance with an embodiment.

FIG. 1B illustrates a flow chart of a method 120 for a client application to generate a visual representation based on mapping data and embedding data, in accordance with an embodiment. Although method 120 is described in conjunction with the systems and figures disclosed herein, persons of ordinary skill in the art will understand that any system that performs method 120 is within the scope and spirit of various embodiments of the present disclosure. In some embodiments, method 120 can be implemented by one or more processors configured to execute instructions to perform functions that implement the steps of method 120, where the instructions can be stored on a memory connected to the one or more processors. In an embodiment, method 120 is performed by a visualization subsystem (e.g., visualization subsystem 250 of FIG. 2A) executing within a client computer system (e.g., client computer system 270 of FIG. 2B).

Method 120 begins at step 122, where the visualization subsystem receives mapping data and embedding data for attributes and aspects. The mapping data and/or embedding data may be received from a cloud server system or from a local cache at the client computer system. Locally cached data may include embedding data. Locally cached data may be stored in nonvolatile memory. In an embodiment, the cloud server system caches specific configurations of mapping data and/or embedding data for lower latency replies when such specific data are requested by the client computer system.

At step 124, the visualization subsystem receives a visual representation request (e.g., from a user interface system comprising the visualization subsystem). Exemplary requests include, without limitation, displaying a sorted list of attributes, displaying attribute to aspect mapping information, sorting according to a selected element, and so forth.

At step 126, the visualization subsystem generates the requested visual representation according to the mapping data and the embedding data. In an embodiment, the visual representation request specifies that a list of attributes should be displayed in sorted order with respect to a vector space distance between word embedding vectors. In another embodiment, the visual representation request specifies that a graph should be generated indicating sentiment for different aspects associated with the digital video files. In various embodiments, these and other types of visual representations may be generated to depict relationships between attributes and aspects, aspects and sentiment information (scores, trends, etc.), and aspects/attributes and individual videos or collections of videos. Furthermore, one or more different types of graphical representations may be presented simultaneously by the visualization subsystem. Method 120 may be repeated as new visual representation requests are received. In certain embodiments, step 124 and step 126 are repeated when a new visual representation requests is received, and previously received and/or cached mapping data and embedding data may be used to generate a subsequent requested visual representation(s).

Figure 2A:
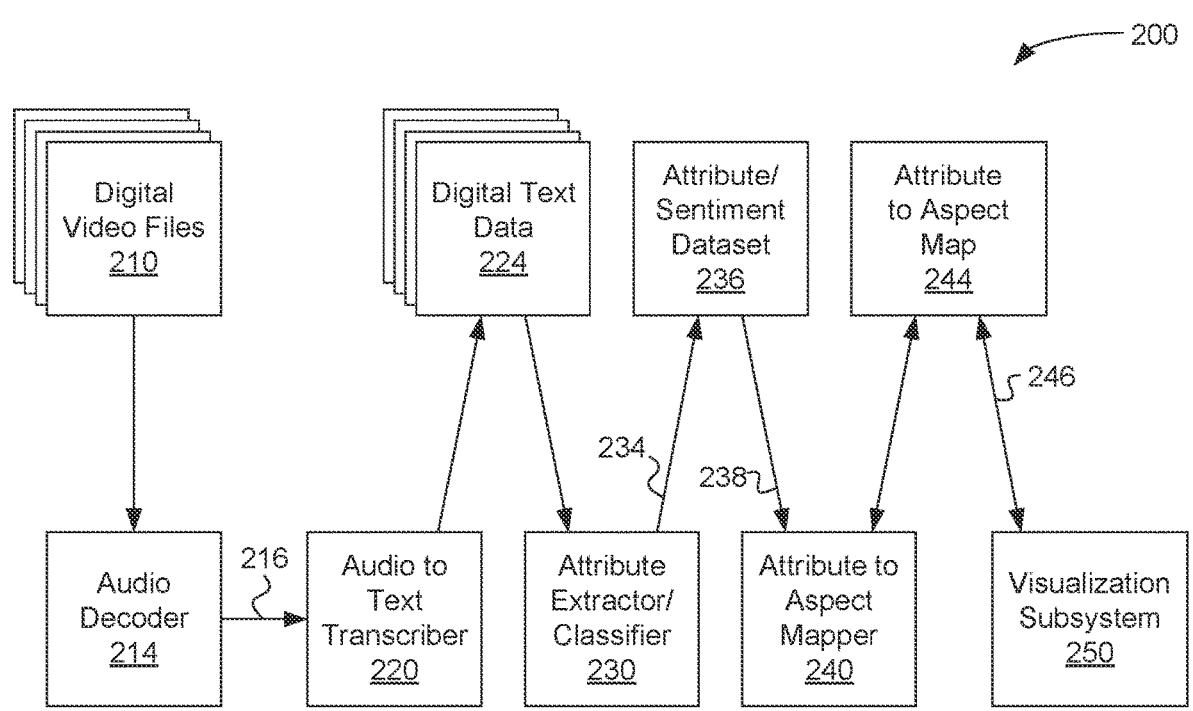
FIG. 2A illustrates a data processing pipeline for visualizing aspects, in accordance with an embodiment.

FIG. 2A illustrates a data processing pipeline 200 for visualizing aspects, in accordance with an embodiment. As shown, digital video files 210 are processed by an audio decoder 214 to generate digital audio signals 216. The audio decoder 214 may comprise a subsystem of a more general video decoder or a decoder specifically designed to extract audio data from digital video files. In an embodiment, the audio decoder 214 comprises a decoder configured to read industry standard MPEG-4 video files and extract audio tracks while optionally discarding video information. In certain embodiments, the audio tracks are encoded according to the industry standard advanced audio coding (AAC) standard. Of course, the digital video files 210 may be encoded according to other digital video file formats and/or digital audio formats without departing from the scope and spirit of the present disclosure.

The digital audio signals 216 are processed by an audio to text transcriber 220 (i.e., speech-to-text) to generate digital text data 224. In an embodiment, the digital text data 224 may be organized as a set of transcripts, each comprising spoken words transcribed from a corresponding digital video file of the digital video files 210. The digital text data 224 can be formatted as plain text (e.g., ASCII text) document (i.e., file) including, optionally, whitespace and/or punctuation. Alternatively, the digital text data 224 can be formatted as a structured document such as Javascript Object Notation (JSON) or Extensible Markup Language (XML) documents to delineate sentence structure and/or punctuation. In such structured documents, each word or sentence can be stored as an object, and the audio to text transcriber 220 can optionally embed characteristics of the word or sentence in the object (e.g., a part of speech associated with each word, a confidence score associated with each transcribed word, or the like). The document can also include additional information such as a language of the text (e.g., English, French, Mandarin, etc.).

The digital text data 224 is processed by an attribute extractor/classifier 230 to identify attributes within different transcripts. Furthermore, the attribute extractor/classifier 230 may classify sentiment associated with different attributes. In an embodiment, the attribute extractor/classifier 230 comprises a BERT LM system, configured to classify words as attributes and/or classify sentiment associated with certain words. The BERT LM may be pre-trained according to a particular task domain, such as product reviews. Furthermore, the BERT LM may also be fine tuned during training to dynamically optimize for the classification task of identifying attributes.

Classification data 234 generated by attribute extractor/classifier 230 is stored in an attribute/sentiment dataset 236. The classification data 234 may include attributes identified from transcripts. Furthermore, the classification data 234 may include sentiment scores assigned to the attributes. In an embodiment, the attribute/sentiment dataset 236 includes a list of unique attributes identified by the attribute extractor/classifier 230. Furthermore, the attribute/sentiment dataset 236 may include sentiment scores associated with the attributes.

An attribute to aspect mapper 240 is configured to receive attribute data 238 comprising unique attributes identified within the transcripts. In an embodiment, the attribute data 238 is analyzed to identify clusters of attributes according to relative distances in word embedding space. A given cluster may include a set of attributes separated by a relatively small distance within the word embedding space. An attribute from a given cluster may be selected as an aspect, with remaining attributes in the cluster being mapped to the aspect. Any technically feasible clustering technique may be performed to identify clusters, such as the well-known density-based spatial clustering of applications with noise (DB SCAN).

In an embodiment, a set of aspects and associated attributes generated by the attribute to aspect mapper 240 may be represented and/or stored within an attribute to aspect map 244. Additionally, the attribute to aspect map 244 may include sentiment information for aspects and may include sentiment information for mapped and unmapped attributes. A mapped attribute is associated with an aspect, while unmapped attributes are not associated with an aspect.

Aspect data 246 may include specific attribute to aspect mappings and may further include sentiment information for aspects and/or attributes. As discussed in greater detail herein, a visualization subsystem 250 receives aspect data 246 to generate a visualization of one or more relationships between an aspect and associated attributes. Furthermore, the visualization subsystem 250 may generate modifications to the aspect data 246 and store the modifications within the attribute to aspect map 244.

In an embodiment, the attribute to aspect mapper 240 is configured to exclude certain attributes prior to performing operations to identify new attribute clusters. For example, attributes that are already mapped to aspects may be excluded from attributes participating in a clustering operation intended to automatically discover new aspects. Automatically discovered aspect candidates may be included within the attribute to aspect map 244 for consideration by a user through the visualization subsystem 250.

Figure 2B:
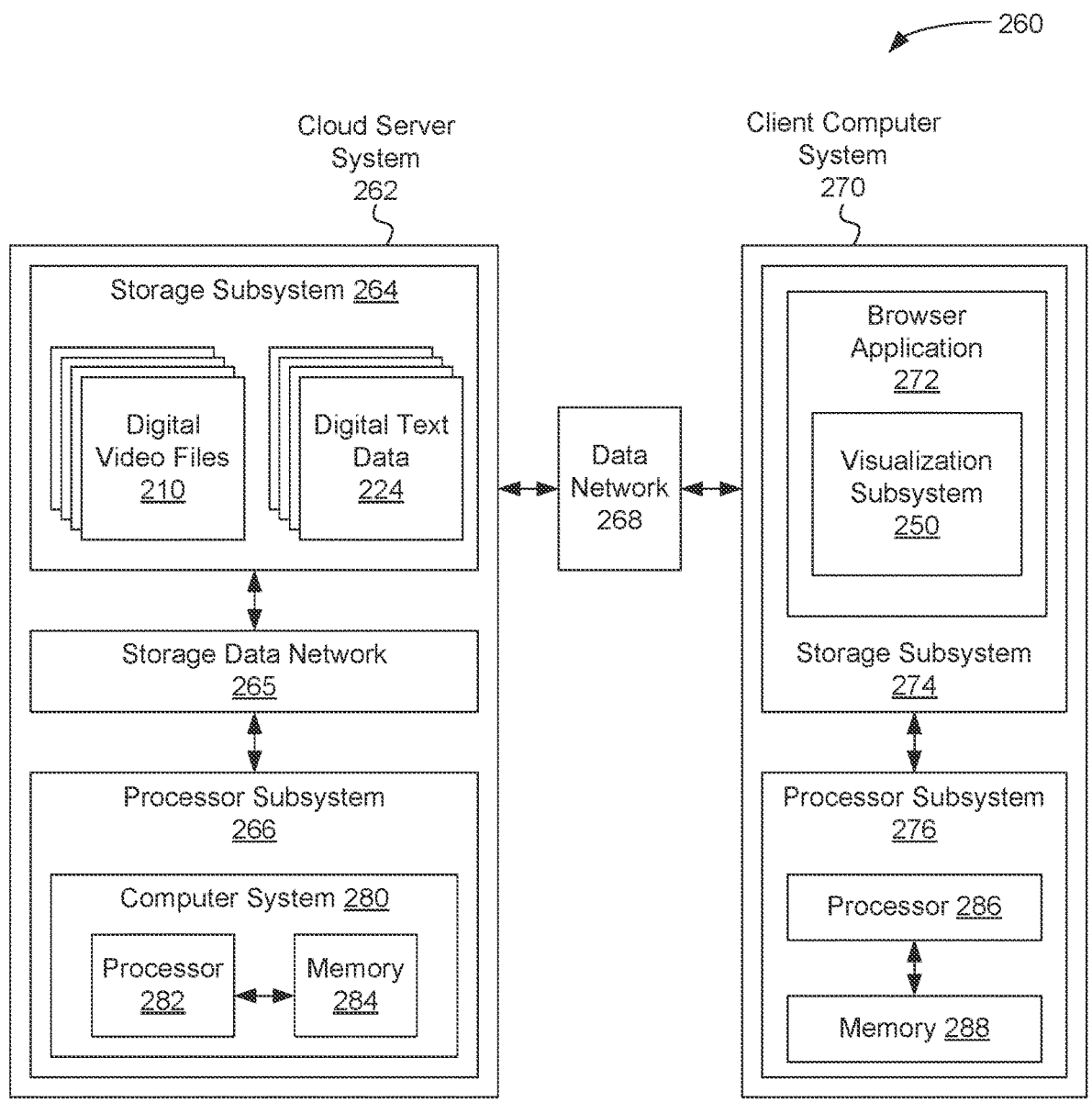
FIG. 2B illustrates a distributed processing system, in accordance with an embodiment.

FIG. 2B illustrates a distributed processing system 260, in accordance with an embodiment. As shown, the distributed processing system 260 includes a cloud server system 262, a data network 268, and a client computer system 270.

The cloud server system 262 includes a storage subsystem 264, a storage data network 265, and a processor subsystem 266. The storage subsystem 264 may include a collection of one or more storage nodes (not shown), which may be located within a single machine room or geographically distributed among two or more different machine rooms. In an embodiment, each storage node includes a mass storage array comprising a plurality of spindle-based hard disk drives, solid state storage drives, or a combination thereof. The storage node also includes a storage controller (not shown) coupled to the mass storage array and a data interface controller (not shown) coupled to a storage data network 265.

The processor subsystem 266 may include one or more computer systems 280, each comprising at least one processor 282 coupled to a local system memory 284, local storage (not shown), and network interfaces (not shown). Each computer system 280 may be provisioned to operate as one or more virtual machines or as one or more physical machines. The processor subsystem 266 may be located within a single machine room or geographically distributed among two or more different machine rooms. The processor subsystem 266 is coupled to the storage data network 265 and configured to access, without limitation, digital video files 210 and digital text data 224.

The data network 268 provides a data communications path between the cloud server system 262 and the client computer system 270. The data network 268 may include optical transport systems, electrical transport systems, wireless transport systems, or combinations thereof. In an embodiment, the data network 268 includes various routers, switches, transport systems, and wireless access points/base stations comprising one or more networks. In some embodiments, the one or more networks include a wide area network (WAN) such as the Internet.

The client computer system 270 may include a laptop, desktop, tablet computer, terminal device, user equipment, or any other technically feasible computing device either stationary or mobile. The client computer system 270 may comprise a processor subsystem 276 coupled to a storage subsystem 274. The processor subsystem 276 comprises a processor 286 configured to execute instructions stored within a memory 288 coupled to the processor 286. Furthermore, instructions may be stored within the storage subsystem 274 and selectively loaded into the memory 288 during execution by the processor 286. In an embodiment, instructions comprising a browser application 272 are stored within the storage subsystem 274 for execution by the processor subsystem 276. As shown, the visualization subsystem 250 is configured to execute within the browser application 272 running on the client computer system 270. Alternatively, the visualization subsystem 250 may execute as a standalone application (independent of the browser application 272) on the client computer system 270.

In an embodiment, the client computer system 270 communicates with the cloud server system 262 to perform various techniques disclosed herein. In certain embodiments, the cloud server system 262 performs steps 102, 104, 106, 108, 110, and 112 of the method 100 of FIG. 1A; furthermore, the client computer system 270 may perform step 114 of the method 100. In alternative embodiments, the client computer system 270 may perform steps 112 and 110. In certain other embodiments, the client computer system 270 and the cloud server system 262 coordinate to perform steps 112 and 110.

In an embodiment, the visualization subsystem 250 executing within the client computer system 270 performs the method 120 of FIG. 1B. Additionally, the visualization subsystem 250 may execute method 350 of FIG. 3C, method 370 of FIG. 3D, and generate user interface 340 of FIG. 3B. Various methods and technique disclosed herein provide mappings from attributes to aspects, generating visual depictions of the mappings and, optionally, graphically depicting aspect sentiment information and/or trends.

Figure 3A:
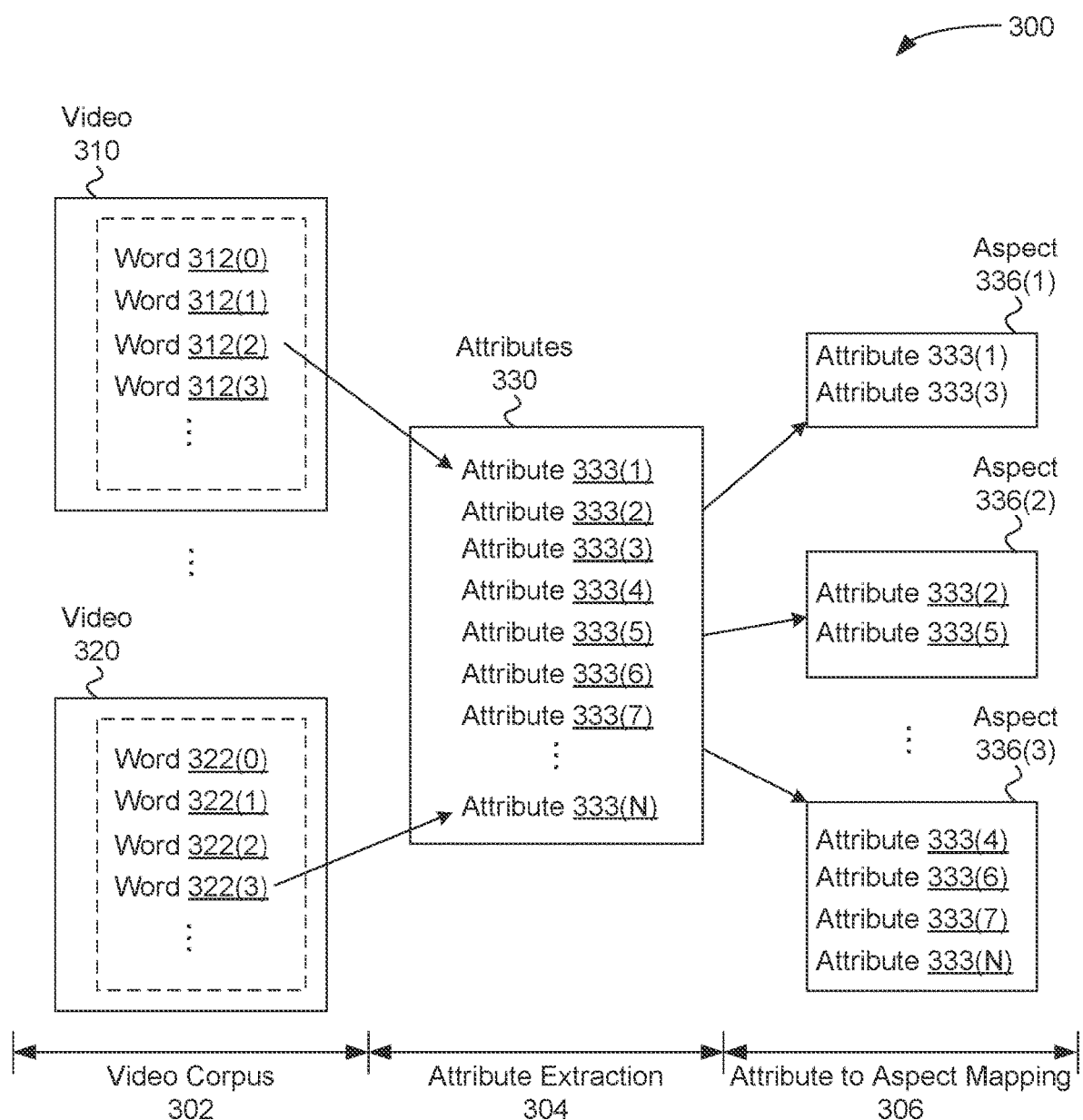
FIG. 3A illustrates mapping attributes to aspects, in accordance with an embodiment.

FIG. 3A illustrates mapping attributes 333 to aspects 336, in accordance with an embodiment. In an exemplary mapping, words 312 are transcribed from a video 310, and words 322 are transcribed from a video 320. A set of attributes 330 is generated from the words 312, 322. In an embodiment, each attribute 333 is unique and instantiated once within the set of attributes 330. A given attribute 333 may be mapped to an aspect 336. In an embodiment, a given aspect is assigned to be one representative attribute 333. For example, aspect 336(1) may be assigned to be the same word as attribute 331(1). In this example, attributes 333(1) and 333(3) are mapped to aspect 336(1). More generally, words from digital video files comprising a video corpus 302 are transcribed, and attribute extraction 304 is applied to the transcribed words to identify attributes 333. Attribute to aspect mapping 306 then associates certain attributes 333 to different aspects 336.

Figure 3B:
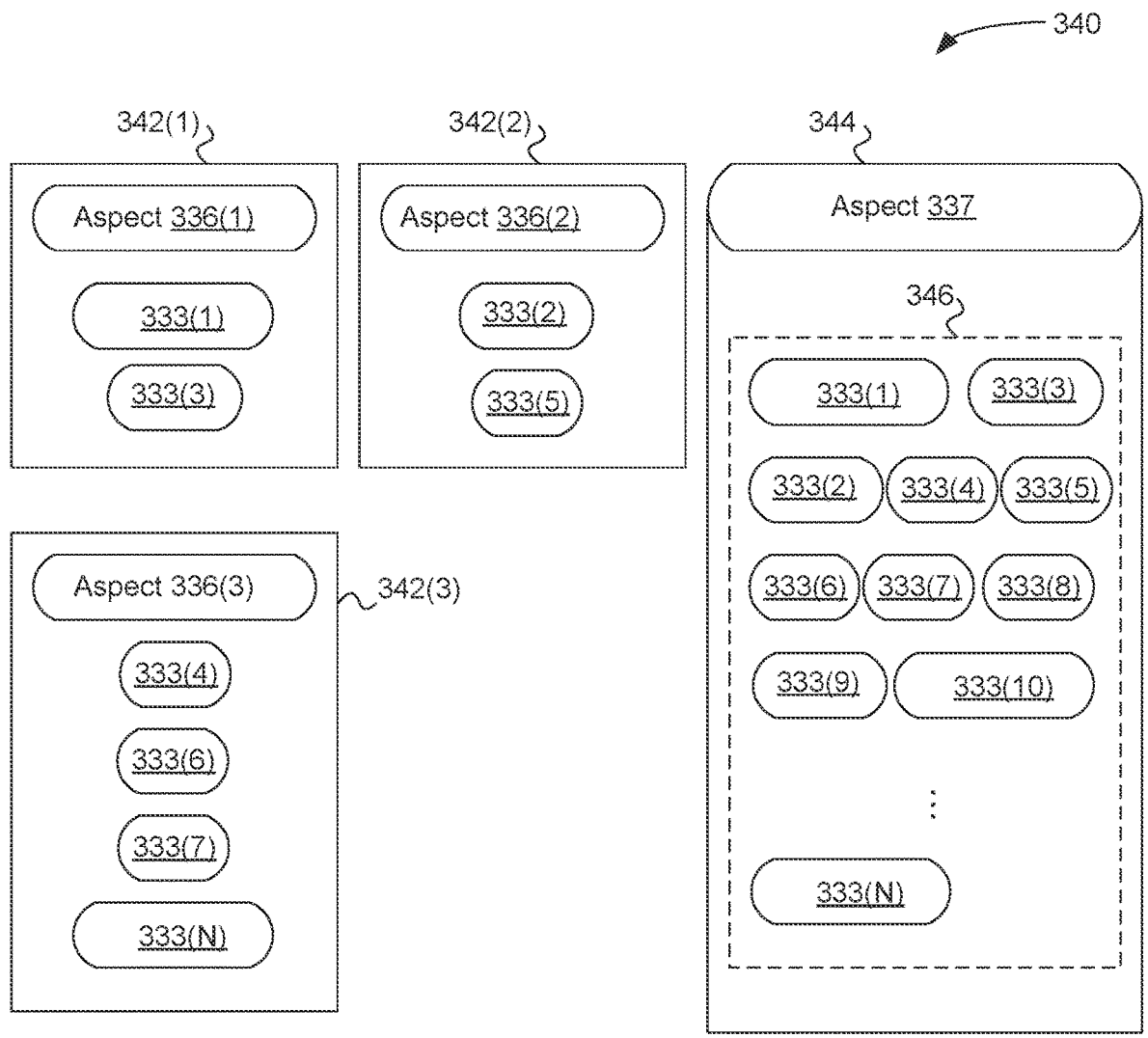
FIG. 3B illustrates a user interface depicting attribute to aspect mappings, in accordance with an embodiment.

FIG. 3B illustrates a user interface 340 depicting attribute to aspect mappings, in accordance with an embodiment. Display elements 342 depict attribute to aspect mappings. As shown, display element 342(1) depicts attributes 333(1) and 333(3) mapped to aspect 336(1); display element 342(2) depicts attributes 333(2) and 333(5) mapped to aspect 336(2); and, display element 342(3) depicts attributes 333(4), 333(6), 333(7) and 333(N) mapped to aspect 336(3). Display element 344 shows an attribute list 346 comprising attributes 333, sorted by vector space distance to a selected aspect 337. In this example, attributes 333(1) and 333(3) are closest to selected aspect 337 in an embedding vector space and attribute 333(N) is furthest. In an embodiment, selected aspect 337 is determined when an input click (e.g., touch selection, mouse click) is received for one of aspects 336(1), 336(2), or 336(3). For example, if aspect 336(1) is associated with the word "weight", then selecting aspect 336(1) causes the selected aspect 337 to display "weight" and the attribute list 346 to be displayed in sorted order according to a vector space distance between aspect 336(1) and each attribute 333 within the attribute list 346.

Figure 3C:
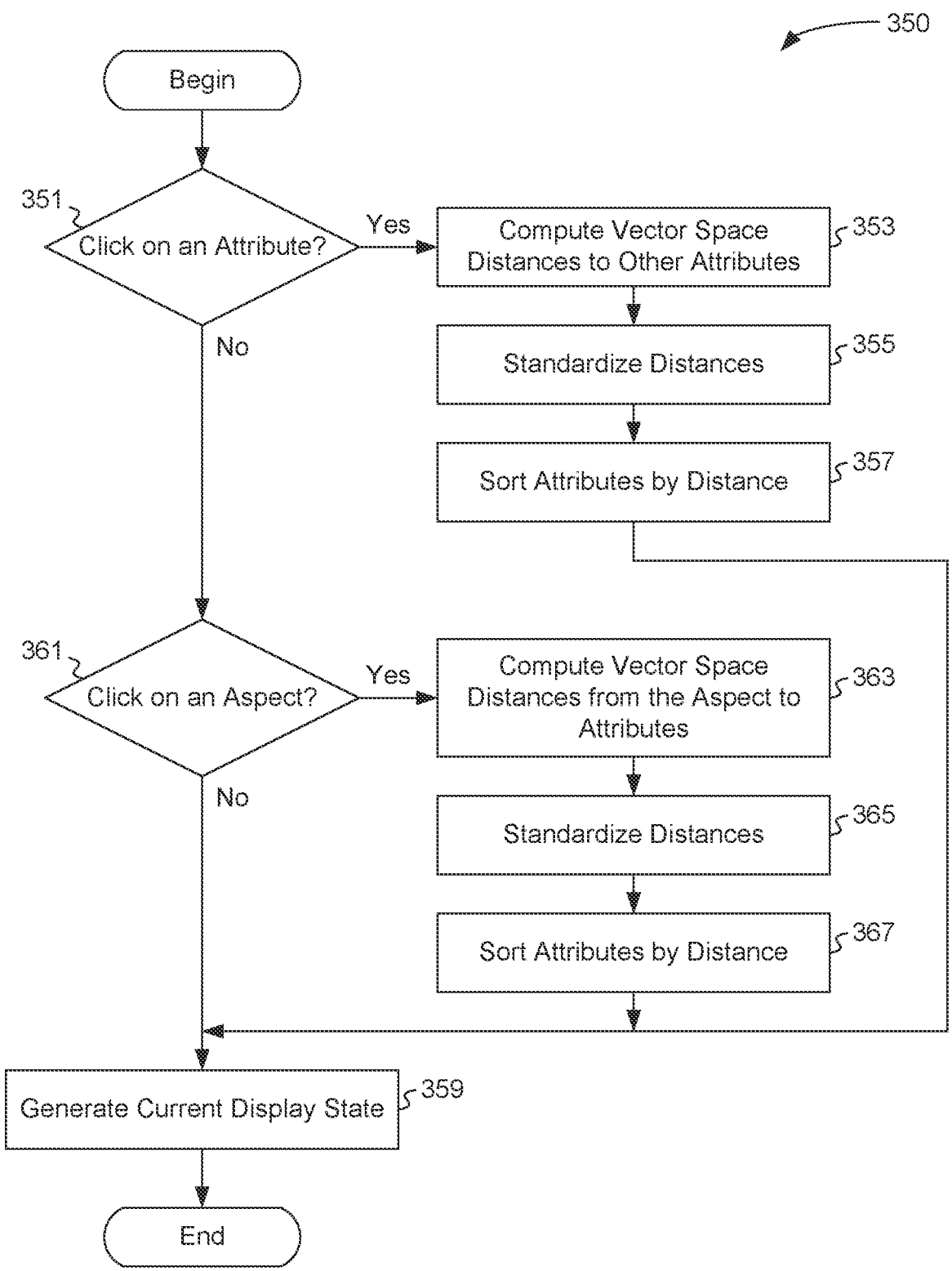
FIG. 3C illustrates a flow chart of a method for displaying attributes based on vector space distance, in accordance with an embodiment.

FIG. 3C illustrates a flow chart of a method 350 for displaying attributes based on vector space distance, in accordance with an embodiment. Although method 350 is described in conjunction with the systems and figures disclosed herein, persons of ordinary skill in the art will understand that any system that performs method 350 is within the scope and spirit of various embodiments of the present disclosure. In some embodiments, method 350 can be implemented by one or more processors configured to execute instructions to perform functions that implement the steps of method 350, where the instructions can be stored on a memory connected to the one or more processors. In an embodiment, method 350 is performed by a visualization subsystem (e.g., visualization subsystem 250 of FIG. 2A) executing within a client computer system (e.g., client computer system 270 of FIG. 2B). In certain embodiments, the method 350 provides an automatic process for generating a sorted list of attributes based on vector space distance (e.g., between word embedding vectors), an approximate measure of potential relevance, to a selected attribute or aspect.

Method 350 begins at step 351, where the visualization subsystem determines whether an input click is located on an attribute (e.g., within user interface 340 of FIG. 3B), thereby selecting the attribute. If the input click is on a selected attribute, the method 350 proceeds to step 353, where the visualization subsystem computes vector space distances between the selected attribute and other attributes. In an embodiment, the vector space distance is computed according to a cosine distance. At step 355, the visualization subsystem standardizes the vector space distances between the selected attribute and the other attributes. In this context, standardized distances may provide a more useful measure of proximity in an embedding vector space and allows for consistent vector space distance thresholds where applicable. In an embodiment, standardizing comprises rescaling a distribution of the vector space distances so that the mean vector space distance is at fixed value (e.g., zero) and the resulting distribution has a fixed standard deviation (e.g., unit, one). Any technically feasible technique may be performed for standardizing the vector space distances, including well-known techniques in the art for standardizing datasets. In alternative embodiments, techniques other than standardization may be performed to scale the vector space distances. At step 357, the visualization subsystem sorts the other attributes according to scaled (e.g., standardized) vector space distances from the selected attribute. In an embodiment, the sort order is from smallest to largest distance. At step 359, the visualization subsystem generates a current display state. In this context, the current display state includes, without limitation, the current sorted order of the attribute list 346 and a displayed rendering of the attribute list 346 within the user interface 340.

Returning to step 351, if the input click is on not a selected attribute, the method 350 proceeds to step 361. At step 361, if the input click is on an aspect, then the aspect is a selected aspect and the method 350 proceeds to step 363, otherwise the method 350 proceeds to step 359. In certain embodiments, different operations beyond the scope of the present disclosure may be performed as part of step 359 to update the overall user interface 340.

At step 363, the visualization subsystem computes vector space distances between the selected aspect and other attributes. In this context the other attributes comprise unmapped attributes. In an embodiment, a given vector space distance between the selected aspect and other attributes is computed as the minimum vector space distance between attributes mapped to the selected aspect and the other attributes. At step 365, the visualization subsystem standardizes the vector space distances between the selected aspect and other attributes. In alternative embodiments, techniques other than standardization may be performed to scale the vector space distances. At step 367, the visualization subsystem sorts the other attributes according to scaled (e.g., standardized) vector space distances. In an embodiment, the sort order is from smallest to largest scaled vector space distance. In an embodiment, the method 350 is performed each time the visualization subsystem receives a relevant input event (e.g., click).

Figure 3D:
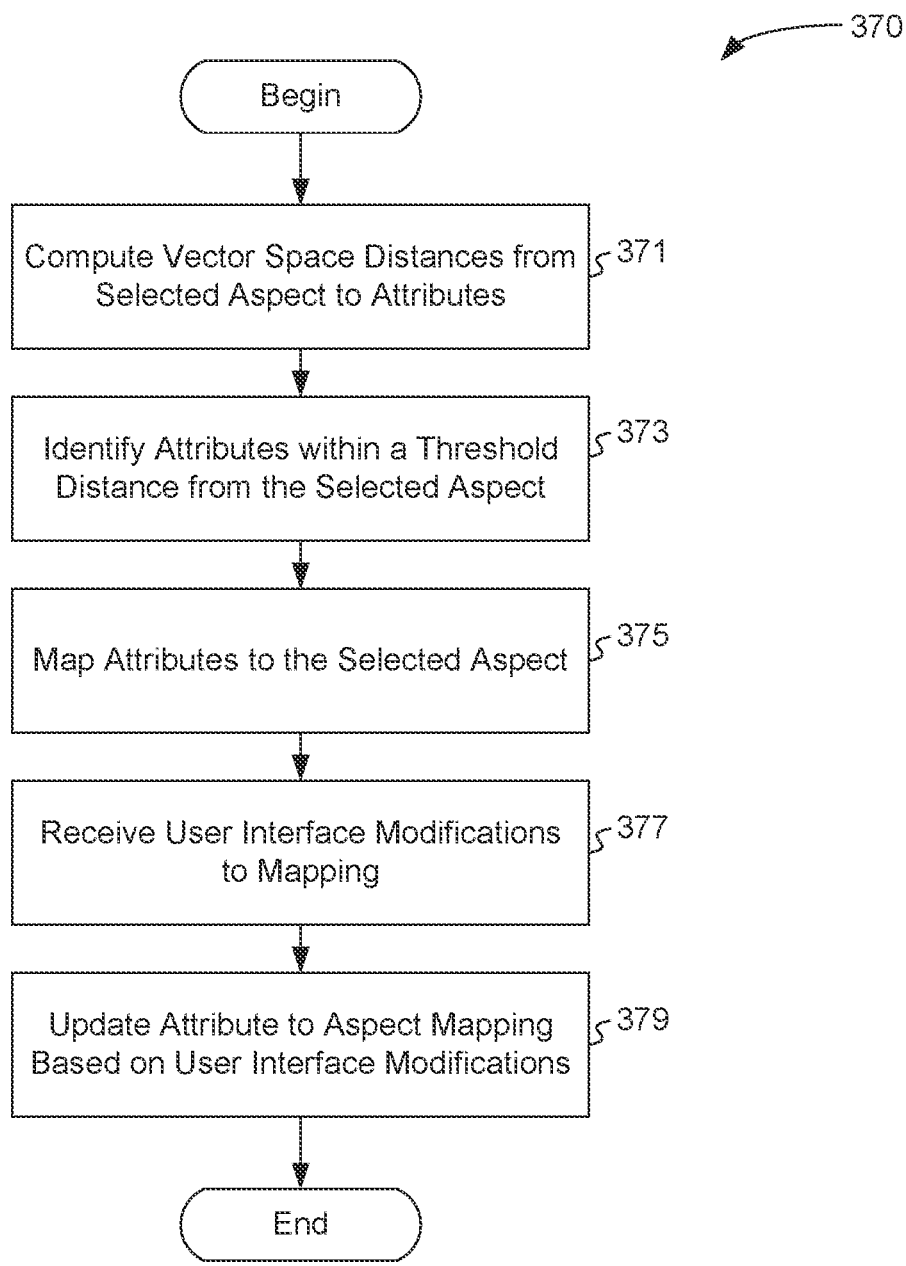
FIG. 3D illustrates a flow chart of a method for mapping attributes to aspects, in accordance with an embodiment.

FIG. 3D illustrates a flow chart of a method 370 for mapping attributes to aspects, in accordance with an embodiment. Although method 370 is described in conjunction with the systems and figures disclosed herein, persons of ordinary skill in the art will understand that any system that performs method 370 is within the scope and spirit of various embodiments of the present disclosure. In some embodiments, method 370 can be implemented by one or more processors configured to execute instructions to perform functions that implement the steps of method 370, where the instructions can be stored on a memory connected to the one or more processors. In an embodiment, method 370 is performed by a visualization subsystem (e.g., visualization subsystem 250 of FIG. 2A) executing within a client computer system (e.g., client computer system 270 of FIG. 2B). In certain embodiments, the method 370 provides an automatic process for generating an initial mapping of attributes to a selected aspect.

Method 370 begins at step 371, where the visualization subsystem computes vector space distances from the selected aspect to other attributes. In an embodiment, a given vector space distance between the selected aspect and other attributes is computed as the minimum vector space distance between attributes mapped to the selected aspect and the other attributes. In certain embodiments, computing the vector space distances includes standardizing the vector space distances. In an embodiment, the other attributes comprise only unmapped attributes (e.g., not already mapped to an aspect). In another embodiment, the other attributes comprise all available attributes (e.g., within the attribute/sentiment dataset 236 of FIG. 2A), which may include other mapped attributes.

At step 373, the visualization subsystem identifies attributes within a threshold distance from the selected aspect. In an embodiment, the threshold distance is specified according to a standardized distribution space. At step 375, the visualization subsystem maps the identified attributes to the selected aspect. In an embodiment, a mapping of identified attributes to the selected aspect is stored within the attribute to aspect map 244 of FIG. 2A.

At step 377, the visualization subsystem receives user interface modifications to the mapping. Such user interface modifications may include, without limitation, drag and drop actions to add or remove attributes from the mapping, a click on a specific add or delete modifier function, and so forth. At step 370, the visualization subsystem updates the mapping based on user interface modifications received at step 377. In an embodiment, the updated mapping is stored within the attribute to aspect map 244. In certain usage cases, a user may want to modify and refine the mapping from identified attributes to the selected aspect; such modification and refinement is provided in step 377 and step 379.

Figure 3E:
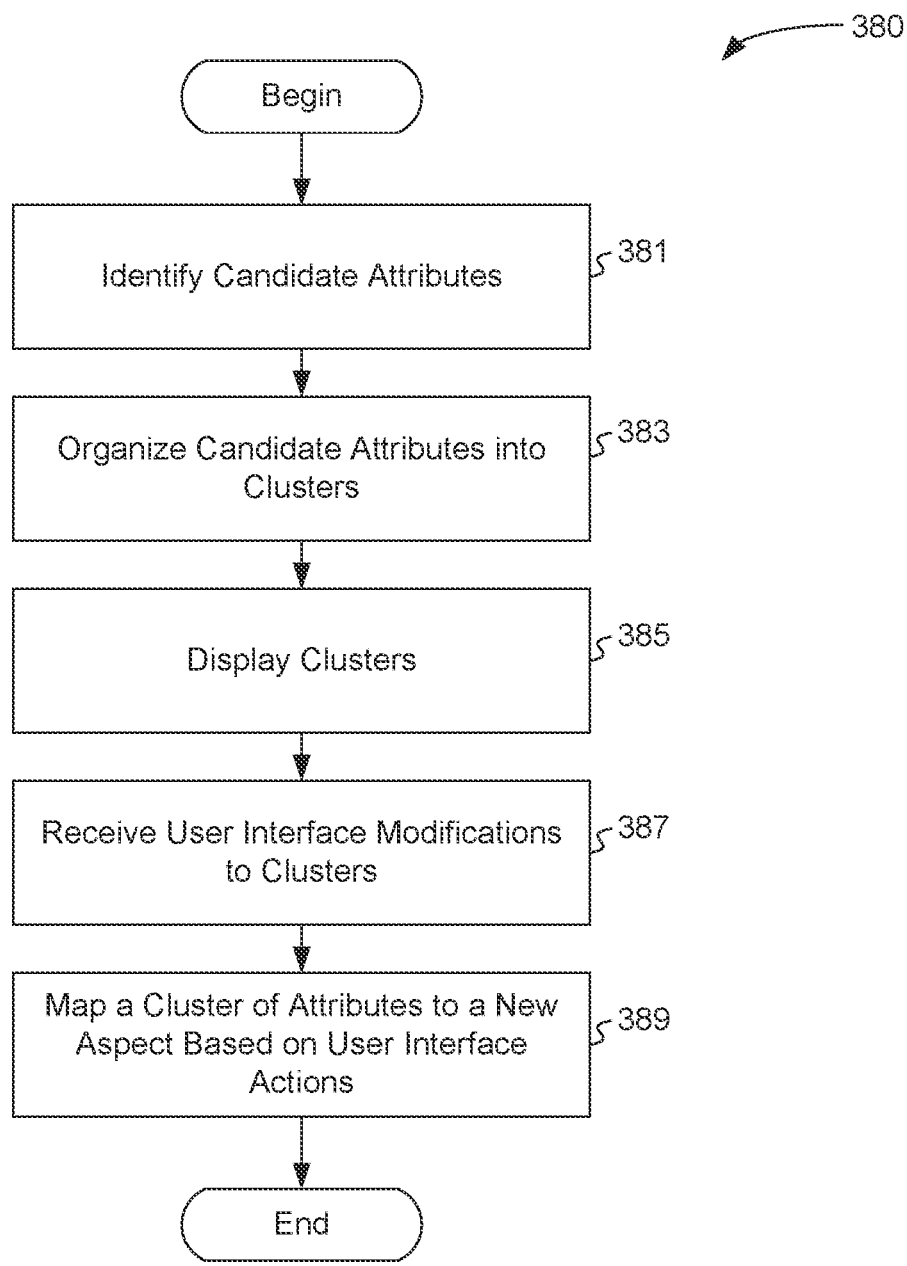
FIG. 3E illustrates a flow chart of a method for identifying a new aspect, in accordance with an embodiment.

FIG. 3E illustrates a flow chart of a method 380 for identifying a new aspect, in accordance with an embodiment. Although method 380 is described in conjunction with the systems and figures disclosed herein, persons of ordinary skill in the art will understand that any system that performs method 380 is within the scope and spirit of various embodiments of the present disclosure. In some embodiments, method 380 can be implemented by one or more processors configured to execute instructions to perform functions that implement the steps of method 380, where the instructions can be stored on a memory connected to the one or more processors. In an embodiment, method 380 is performed by a visualization subsystem (e.g., visualization subsystem 250 of FIG. 2A) executing within a client computer system (e.g., client computer system 270 of FIG. 2B). In certain embodiments, method 380 provides automatic discovery of potentially useful new aspects not specifically identified by a human operator.

Method 380 begins at step 381, where the visualization subsystem identifies candidate attributes. In an embodiment, the candidate attributes comprise unmapped attributes. In another embodiment, the candidate attributes comprise all available attributes (e.g., within the attribute/sentiment dataset 236 of FIG. 2A), which may include other mapped attributes. At step 383, the visualization subsystem organizes the candidate attributes into clusters and identifies one or more clusters. Any technique may be performed to organize the candidate attributes into clusters without departing the scope and spirit of various embodiments. In an embodiment, a DBSCAN technique is performed to organize the candidate attributes into clusters. In other embodiments, different clustering techniques (e.g., k-means clustering, nearest neighbor chain, etc.) may be performed to organize the candidate attributes into clusters. In certain embodiments, word embedding vectors for the candidate attributes are standardized to generate standardized embedding vectors; and, clustering operations are performed on the standardized embedding vectors to organize the candidate attributes into clusters. At step 385, the visualization subsystem displays one or more identified clusters. In an embodiment, the clusters may be displayed as lists of related candidate attributes. Furthermore, a candidate aspect may be automatically selected among the related candidate attributes based on relative location in embedded vector space within the cluster.

At step 387, the visualization subsystem receives user interface modifications to the clusters. Such modifications may include, without limitation, adding an attribute to a cluster, removing an attribute from the cluster, moving the attribute from one cluster to a different cluster, and identifying an attribute within a cluster as an aspect that represents the cluster. In an embodiment, the user interface modification comprises a drag and drop action, swipe action, or any other functionally equivalent action. At step 389, the visualization subsystem maps a cluster of attributes to a new aspect based on the user interface actions. The new aspect may be automatically identified or manually identified through a user interface modification.

In certain embodiments, the visualization subsystem 250 of FIG. 2B executes programming instructions to perform method 380 on client computer system 270. In other embodiments, the visualization subsystem 250 executes programming instructions that cause cloud server system 262 to perform at least one or more method steps of method 380.

Figure 4A:
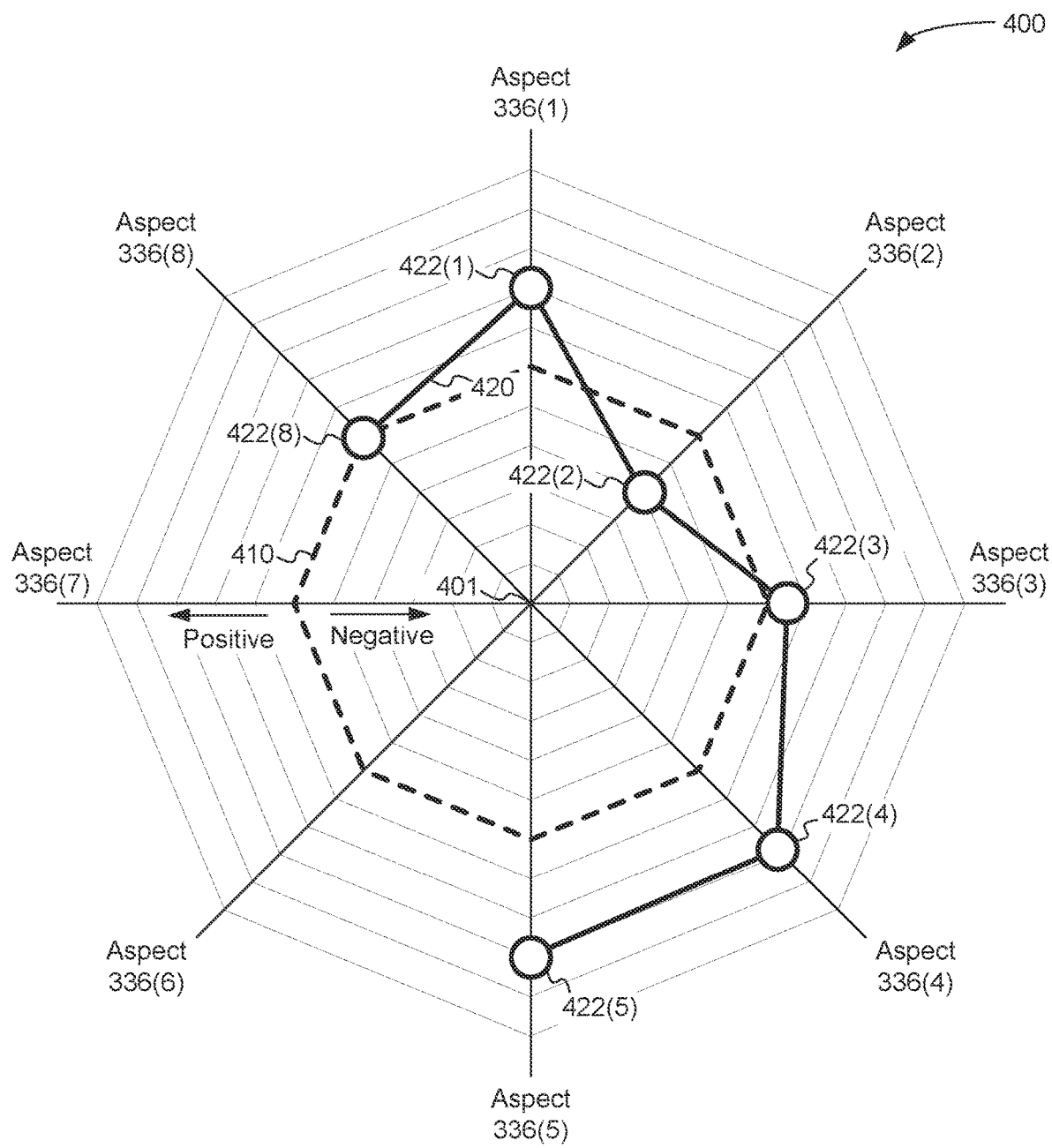
FIG. 4A illustrates a plot of a sentiment contour for different aspects, in accordance with an embodiment.

FIG. 4A illustrates a plot 400 of a sentiment contour 420 for different aspects 336, in accordance with an embodiment. The different aspects 336 are associated with respective axes, each radiating out from a center point 401 of the plot 400. A neutral contour 410 indicates neutral sentiment. An aspect 336 plotted at the neutral contour 410 has a neutral sentiment score; an aspect 336 plotted closer to the center point 401 has a negative sentiment score, and an aspect 336 plotted further from the center point 401 has a positive sentiment score. For example, as shown, aspect 336(8) has a neutral sentiment score, as indicated by marker 422(8); aspect 336(1) has a positive sentiment score, as indicated by marker 422(1); and, aspect 336(2) has a negative sentiment score, as indicated by marker 422(2). In an embodiment, a sentiment score for each aspect 336 is calculated as an aggregate of sentiment scores for attributes mapped to the aspect 336. A given aggregate may be calculated according to any technically feasible technique, such as an average, a weighted average, a min or max, and so forth. The sentiment score may be calculated according to a specified scope, such scope ranging from a specific digital video to a set of selected digital videos. In an embodiment, each different digital video is given equal weight with respect to calculating sentiment scores. In an alternative embodiment, each different digital video is assigned a different weight with respect to calculating sentiment scores, such weight calculated according to a contribution metric, such as a number of occurrences of attributes having individual sentiment scores or a separate sentiment strength assessment for each digital video.

In an embodiment, the aspects 336(1) through 336(8) represent aspects identified within a given dataset comprising the digital video files 210 of FIG. 2A. The dataset may correspond to a particular study, and the study may include a subset of digital video files from the overall set of digital video files 210. A given version of plot 400 may include only certain aspects 336, or sentiment scores for the aspects 336, that are present in a given subset. For example, although aspects 336(1) through 336(8) may be present in a data set, only aspects 336(8), 336(1), 336(2), 336(3), 336(4), and 336(5) are plotted here because only these aspects are present along with sentiment scores in an exemplary subset, while no aspect sentiment data is available for aspects 336(6) and 336(7). The subset may comprise aspects and related sentiment scores for a single digital video file or a collection of digital video files. In an embodiment, a study comprises a specific set of digital video files, and related aspects and sentiment scores define the subset.

Figure 4B:
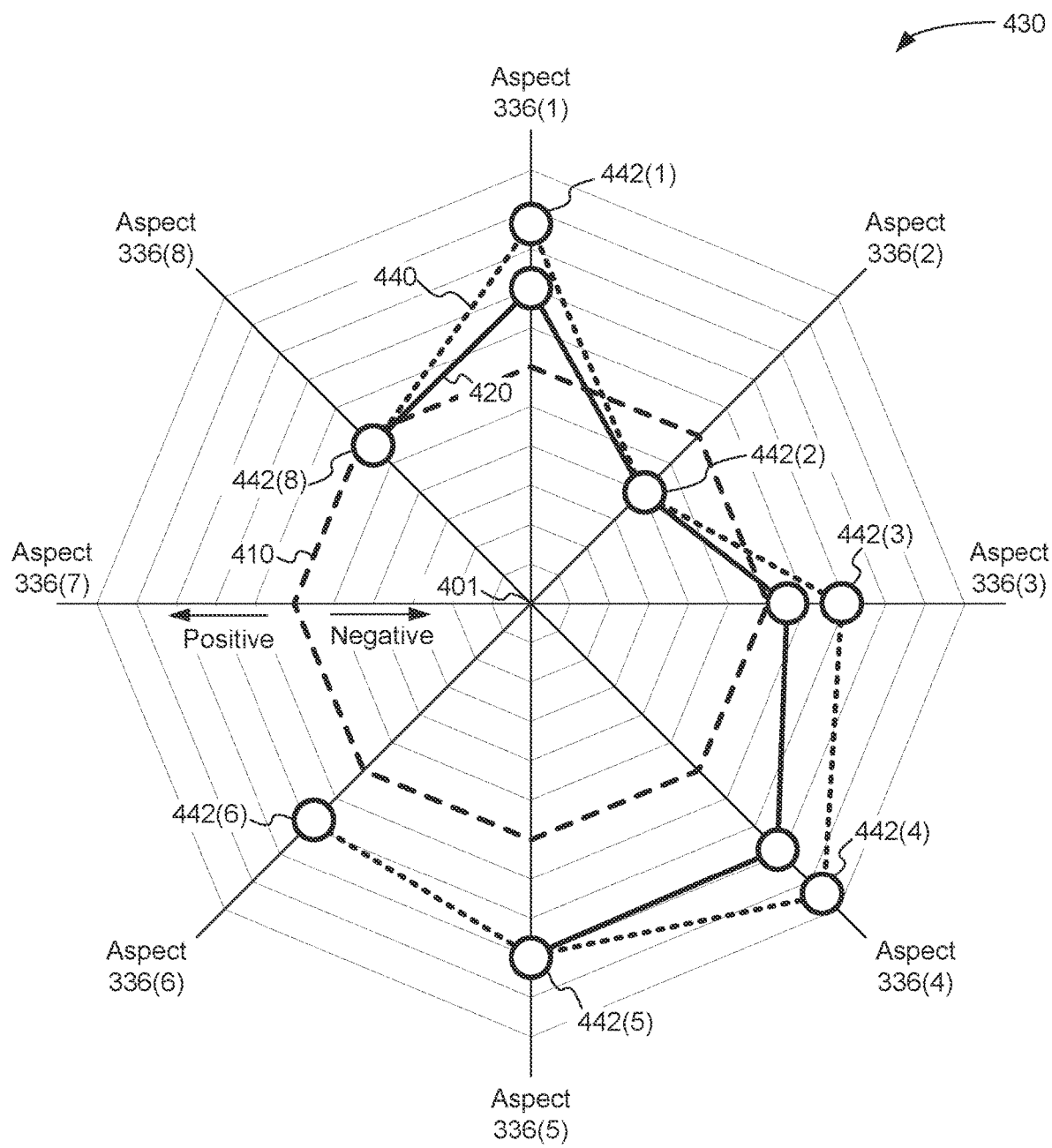
FIG. 4B illustrates a plot of two sentiment contours, in accordance with an embodiment.

FIG. 4B illustrates a plot 430 of two sentiment contours 420, 440, in accordance with an embodiment. As shown, certain sentiment scores for different aspects 336 are different between sentiment contour 420 and sentiment contour 440, while certain sentiment scores are substantially the same. For example, sentiment for aspect 336(8) is largely neutral for sentiment contours 420, 440, while sentiment improves for aspect 336(1) going from sentiment contour 420 to sentiment contour 440. Furthermore, aspect 336(6) is present in sentiment contour 440, while not being present in sentiment contour 420. In an embodiment sentiment contour 420 is associated with a first study, while sentiment contour 440 is associated with a second study. In another embodiment, sentiment contour 420 is generated from a first digital video file, while sentiment contour 440 is generated from a second digital video file.

In the context of comparing different studies taken at different times, comparing sentiment contours provides a visual depiction of trends. In various other contexts, comparing sentiment contours provides a visual depiction of sentiment differences between/among market segments, regional differences, and so forth.

It is noted that the techniques described herein are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such flash memory, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format.

It should be understood that the arrangement of components illustrated in the Figures described are exemplary and that other arrangements are possible. It should also be understood that the various system components defined by the claims, described below, and illustrated in the various block diagrams represent logical components in some systems configured according to the subject matter disclosed herein.

For example, one or more of these system components may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

It will be recognized that the various actions, functions, and methods disclosed herein may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventors for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A method, comprising:
    decoding, by one or more processors, digital audio signals from a set of digital video files;
    transcribing, by the one or more processors, the digital audio signals into corresponding digital text data wherein the digital text data comprises a plurality of words;
    extracting, by the one or more processors, attributes from the digital text data, wherein each attribute comprises a word included in the plurality of words in the digital text data;
    determining, by the one or more processors, a mapping between at least a portion of the attributes and an aspect, wherein the mapping indicates a set of mapped attributes for the aspect, and the attributes comprise a set of unmapped attributes and the set of mapped attributes for the aspect;
    generating, by the one or more processors, a set of mapping data that includes the mapping and word embedding data corresponding to the attributes; and
    generating a visual representation by:
        for each unmapped attribute in the set of unmapped attributes, calculating a vector space distance as a minimum cosine distance between the word embedding vector for the unmapped attribute and the word embedding vector for each of the attributes in the set of mapped attributes for the aspect,
        sorting the unmapped attributes in the set of unmapped attributes according to each vector space distance, and
        rendering a display image depicting the set of unmapped attributes in a sorted order,
    wherein the aspect is a descriptor associated with a collection of related attributes.

2. The method of claim 1, wherein the visual representation is generated by a client computer system connected to the one or more processor via a network.

3. The method of claim 1, further comprising selecting, by the one or more processors, the set of digital video files.

4. The method of claim 1, wherein extracting the attributes comprises classifying, by a natural language sequence tagging algorithm, the plurality of words within the digital text data.

5. The method of claim 1, wherein extracting the attributes comprises classifying, by a bidirectional encoder representations from transformers language model, the plurality of words within the digital text data.

6. The method of claim 1, wherein determining the mapping comprises receiving input commands from a user interface, wherein each input command associates a specific attribute with a specific aspect.

7. The method of claim 1, wherein determining the mapping comprises identifying clusters of attributes, and assigning each cluster of attributes to a specific aspect.

8. The method of claim 7, wherein identifying the clusters comprises performing a density-based spatial clustering of applications with noise operation on a set of word embedding vectors corresponding to the attributes.

9. The method of claim 8, wherein the word embedding vectors are standardized embedding vectors.

10. The method of claim 1, further comprising generating, by the one or more processors, a sentiment score for the aspect according to a bidirectional encoder representations from transformers language model.

11. The method of claim 10, further comprising generating, by a client computer system connected to the one or more processors via a data network, a sentiment contour based on the sentiment score.

12. A method comprising:
   directing, via a client computer system, a cloud server system to decode digital audio signals from a set of digital video files, wherein the cloud server system is connected to the client computer system via a data network;
   directing, via the client computer system, the cloud server system to transcribe the digital audio signals into corresponding digital text data wherein the digital text data comprises a plurality of words;
   directing, via the client computer system, the cloud server system to extract attributes from the digital text data, wherein each attribute comprises a word included in the plurality of words in the digital text data;
   directing, via the client computer system, the cloud server system to determine a mapping between the attributes and an aspect, wherein the mapping indicates a set of mapped attributes for the aspect, and the attributes comprise a set of unmapped attributes and the set of mapped attributes for the aspect;
   directing, via the client computer system, the cloud server system to generate a set of mapping data and word embedding data corresponding to the attributes; and
   generating, via the client computer system, a visual representation by:
      for each unmapped attribute in the set of unmapped attributes, calculating a vector space distance as a minimum cosine distance between the word embedding vector for the unmapped attribute and the word embedding vector for each of the attributes in the set of mapped attributes for the aspect,
      sorting the unmapped attributes in the set of unmapped attributes according to each vector space distance, and
      rendering a display image depicting the set of unmapped attributes in a sorted order,
   wherein the aspect is a descriptor associated with a collection of related attributes.

13. The method of claim 12, wherein to transcribe the digital audio signals, the cloud server system performs an on-demand function.

14. The method of claim 12, wherein to extract attributes, the cloud server system performs an on-demand function.

15. The method of claim 12, further comprising directing the cloud server system to generate a sentiment score for the aspect according to a bidirectional encoder representations from transformers language model.

16. The method of claim 15, wherein to generate the sentiment score, the cloud server performs an on-demand function.

17. A device, comprising:
   a non-transitory memory storing instructions; and
   one or more processors in communication with the non-transitory memory, wherein the one or more processors execute the instructions to:
      receive mapping data that associates a set of mapped attributes with an aspect;
      receive word embedding vectors corresponding to the set of mapped attributes and word embedding vectors corresponding to a set of unmapped attributes;
      receive a user interface request; and
      generate a visual display responsive to the user interface request by:
         for each unmapped attribute in the set of unmapped attributes, calculating a vector space distance as a minimum cosine distance between the word embedding vector for the unmapped attribute and the word embedding vector for each of the attributes in the set of mapped attributes for the aspect;
         sorting the unmapped attributes in the set of unmapped attributes according to each vector space distance; and
         rendering a display image depicting the set of unmapped attributes in a sorted order.

18. The device of claim 17, wherein each vector space distance is scaled according to a standardization function.

* * * * *